(12) United States Patent
Deschamps et al.

(10) Patent No.: US 11,799,124 B2
(45) Date of Patent: Oct. 24, 2023

(54) USE OF LITHIUM NITRATE AS SOLE LITHIUM SALT IN A GELLED LITHIUM BATTERY

(71) Applicant: BLUE SOLUTIONS, Ergue Gaberic (FR)

(72) Inventors: Marc Deschamps, Quimper (FR); Margaud Lecuyer, Combrit (FR)

(73) Assignee: BLUE SOLUTIONS, Ergue Gaberic (FR)

( * ) Notice: Subject to any disclaimer, the term of this patent is extended or adjusted under 35 U.S.C. 154(b) by 393 days.

(21) Appl. No.: 16/762,485

(22) PCT Filed: Nov. 19, 2018

(86) PCT No.: PCT/FR2018/052897
§ 371 (c)(1),
(2) Date: May 7, 2020

(87) PCT Pub. No.: WO2019/097190
PCT Pub. Date: May 23, 2019

(65) Prior Publication Data
US 2020/0266480 A1    Aug. 20, 2020

(30) Foreign Application Priority Data
Nov. 19, 2018 (FR) ...................................... 1760904

(51) Int. Cl.
| | | |
|---|---|---|
| *H01M 10/052* | (2010.01) | |
| *H01M 4/38* | (2006.01) | |
| *H01M 4/40* | (2006.01) | |
| *H01M 4/58* | (2010.01) | |
| *H01M 10/0565* | (2010.01) | |
| *H01M 4/62* | (2006.01) | |
| *H01M 4/02* | (2006.01) | |

(52) U.S. Cl.
CPC ......... *H01M 10/052* (2013.01); *H01M 4/382* (2013.01); *H01M 4/405* (2013.01); *H01M 4/5825* (2013.01); *H01M 4/62* (2013.01); *H01M 10/0565* (2013.01); *H01M 2004/027* (2013.01); *H01M 2004/028* (2013.01); *H01M 2300/0085* (2013.01)

(58) Field of Classification Search
None
See application file for complete search history.

(56) References Cited

U.S. PATENT DOCUMENTS

| | | |
|---|---|---|
| 10,586,986 B2 | 3/2020 | Lecuyer et al. |
| 2014/0050990 A1 | 2/2014 | Yuan et al. |
| 2015/0311492 A1 | 10/2015 | Wang et al. |
| 2018/0277885 A1* | 9/2018 | Takami ............... H01M 10/049 |

FOREIGN PATENT DOCUMENTS

| | | | |
|---|---|---|---|
| CN | 101 381 501 | | 3/2009 |
| CN | 103098287 A | | 5/2013 |
| CN | 107251287 A | | 10/2017 |
| EP | 2 562 865 | * | 2/2013 |
| JP | 10-134817 | * | 5/1998 |
| JP | H10 134817 | | 5/1998 |
| JP | 2005197175 A | | 7/2005 |

OTHER PUBLICATIONS

Search Report dated Jun. 20, 2018.

* cited by examiner

*Primary Examiner* — Laura Weiner
(74) *Attorney, Agent, or Firm* — Greer, Burns & Crain, Ltd

(57) ABSTRACT

The invention relates to the use of lithium nitrate as sole lithium salt providing the ion conductivity in a gelled rechargeable lithium metal battery not comprising polysulfide ions, for improving its lifetime.

9 Claims, 1 Drawing Sheet

USE OF LITHIUM NITRATE AS SOLE LITHIUM SALT IN A GELLED LITHIUM BATTERY

RELATED APPLICATION

This application is a National Phase of PCT/FR2018/052897 filed on Nov. 19, 2018 which claims the benefit of priority to French Patent Application No. 17 60904, filed on Nov. 20, 2017, the entirety of which are incorporated by reference.

The present invention relates to the general technical field of lithium batteries.

More particularly, the invention relates to the use of lithium nitrate ($LiNO_3$) as sole lithium salt providing the ion conductivity in a gelled rechargeable lithium metal battery not comprising polysulfide ions. In particular, it relates to a non-aqueous gelled electrolyte for a lithium battery comprising lithium nitrate as sole lithium salt providing the ion conductivity; it also relates to a gelled positive electrode for a lithium battery comprising lithium nitrate as sole lithium salt providing the ion conductivity; finally, it finally relates to a gelled lithium battery comprising a positive electrode, a gelled electrolyte and a negative electrode based on lithium metal or on a lithium alloy in which the gelled electrolyte and/or the positive electrode comprise lithium nitrate as sole lithium salt providing the ion conductivity.

DESCRIPTION OF PRIOR ART

Lithium batteries are intended in particular for motor vehicles and also for the stationary storage of electrical energy.

Among lithium batteries, lithium-metal-polymer (or LMP) batteries are "all-solid-state" batteries generally existing in the form of an assembly of thin superimposed films. Four functional films participate in their composition: i) a negative electrode (anode) made of lithium metal or of lithium alloy ensuring the provision of the lithium ions during the discharge of the battery, ii) a solid polymer electrolyte which conducts the lithium ions, iii) a positive electrode (cathode) composed of an electrode active material which acts as a receptacle where the lithium ions will be inserted, and finally iv) a current collector in contact with the positive electrode which makes it possible to provide the electrical connection.

The solid polymer electrolyte is generally composed of a polymer based on poly(ethylene oxide) (PEO) and on at least one lithium salt; the positive electrode is normally composed of a material, the working potential of which is less than 4V vs $Li^+$/Li (i.e. the insertion/deinsertion potential of the lithium is less than 4V), such as, for example, a metal oxide (such as, for example, $V_2O_5$, $LiV_3O_8$, $LiCoO_2$, $LiNiO_2$, $LiMn_2O_4$ and $LiNi_{0.5}Mn_{0.5}O_2$) or a phosphate of $LiMPO_4$ type, where M represents a metal cation selected from the group Fe, Mn, Co, Ni and Ti, or combinations of these cations, such as, for example, $LiFePO_4$, and also contains carbon and a polymer; and the current collector generally consists of a metal sheet. The conductivity of the ions is provided by the dissolution of the lithium salt in the polymer participating in the composition of the solid electrolyte.

Lithium batteries, and particularly LMP batteries, exhibit a certain number of advantages.

Firstly, the density by weight of LMP batteries is of the order of 120 to 180 Wh/kg, i.e. an energy density at least 2.5 times higher than that of lead batteries of combustion cars (30-50 Wh/kg). Furthermore, LMP batteries do not have a memory effect and it is thus pointless to completely discharge them before recharging them, as in the case of some other technologies (Ni—Cd). Finally, with a voltage identical to that of lithium-ion batteries (of the order of 3.4 V), LMP batteries do not require any maintenance and have a lifetime of close to 10 years, which is advantageous from a commercial viewpoint and which renders them relevant for applications requiring electric traction.

Nevertheless, LMP batteries exhibit a major disadvantage. This is because, in order to use them, they have to be maintained at a temperature of approximately 60-80° C., which to all intents and purposes requires keeping them under charge, the vehicle being left connected to the mains when it is not running. Failing that, LMP batteries empty in a few days because of their temperature maintenance.

One of the solutions for overcoming this problem is the use of lithium batteries comprising, just as in LMP batteries, a negative electrode consisting of a sheet of lithium metal or of a lithium alloy and a positive electrode made of a material capable of inserting lithium ions, but in which batteries the polymer electrolyte is replaced by a gelled electrolyte (lithium-metal-gel batteries). This is because these batteries exhibit lower operating temperatures than those of LMP batteries, in particular of the order of 0 to 60° C. However, during the operation of these batteries, a lithium foam is formed at the surface of the negative electrode. This lithium foam is due to an electrodeposit of poor quality on the negative electrode, the consequence of which is to affect the lifetime of such batteries. This is related to the lack of robustness of the passivation layer on the surface of the lithium electrode.

This is because, during the operation of the battery, a "passivation" layer (also known under the name Solid Electrolyte Interface ou SEI) is formed on the negative electrode. This passivation layer is produced in particular by reduction of the electrolyte at the surface of the negative electrode from the first cycle of the battery, consuming a part of the lithium ions present in the electrolyte. This passivation layer is essential to the satisfactory operation of the negative electrode and its quality is determining for its future performances and those of the battery comprising it. It has to exhibit a certain number of qualities: i) be sufficiently conductive of lithium ions, ii) non-conductive of electrons and iii) exhibit good mechanical strength. This is because, when the quality of the passivation layer is not sufficient, a gradual loss in capacity and/or in coulombic efficiency of the battery and a decrease in its lifetime are observed.

Various solutions have already been proposed for improving the quality of the passivation layer in lithium batteries comprising a lithium metal negative electrode, especially the addition of additives, in particular in the composition of the electrolyte.

Mention may in particular be made, by way of example, of the addition of vinylene carbonate, as described, for example, in the paper by H. Ota et al. (Electrochimica Acta, 2004, 49, 565-572).

However, these solutions are not entirely satisfactory, in particular because the lithium salts used remain expensive and because the cyclabilities are limited to less than 100 cycles.

Furthermore, it is known to use lithium nitrate as additive in the electrolyte of lithium-sulfur batteries. Lithium-sulfur batteries comprise a negative electrode based on lithium metal or on a lithium-based alloy, a positive electrode generally made of porous carbon and comprising a positive electrode active material based on sulfur or on a sulfur-containing organic compound, said electrodes being separated by a separator impregnated with an electrolyte comprising lithium ions in solution in a solvent. Lithium-sulfur batteries are one of the most promising systems for the electrochemical storage of energy, it being possible for such batteries to theoretically achieve a high specific capacity and a high energy density by weight of 1675 mAh/$g_{sulfur}$ and of 2600 Wh/$kg_{sulfur}$ respectively. The advantage for lithium-sulfur batteries is, however, tempered by a certain number of problems, including the problem of the redox shuttle due to the presence in particular of polysulfide ions generated by reduction of sulfur within the positive electrode. The polysulfide ions formed at the positive electrode are soluble in the majority of liquid electrolytes. They thus migrate towards the negative electrode, where they are again reduced. This phenomenon considerably slows down the charging of batteries of this type by consuming a part of the current in order to supply the redox shuttle. In order to combat this phenomenon, it has already been proposed, in particular by Li W. et al. (Nature Communications, DOI: 10, 1038/ncomms8436, 2015, pp. 1-8), to add small amounts (of the order of 0.15M or 0.75M approximately) of lithium nitrate as additive in the electrolyte of lithium-sulfur batteries containing a lithium salt and polysulfide ions, in order to generate a synergistic effect between said polysulfide ions and the lithium nitrate to form a stable passivation layer, which is supposed to reduce the redox shuttle phenomenon. However, this solution cannot be transposed to batteries not comprising a sulfur-based positive electrode and thus not comprising polysulfide ions in the electrolyte.

OBJECTS AND SUMMARY

The inventors thus devoted themselves to the goal of providing a solution which makes it possible to overcome the problems encountered in gelled lithium batteries. In particular, the inventors set themselves the aim of providing a solution which makes it possible to improve the lifetime of gelled lithium batteries.

Entirely counter-intuitively, the inventors have discovered that the use of lithium nitrate as sole lithium salt in a gelled rechargeable lithium metal battery not comprising polysulfide ions makes it possible to improve the quality of the passivation layer, in particular by improving the quality of the lithium deposit on the negative electrode, and thus the lifetime of said battery. Although the conductivity of this lithium salt is lower than that of the lithium salts conventionally used in lithium batteries, the inventors have discovered that the improvement in the quality of the interface between the electrolyte and the negative electrode made it possible to obtain lithium batteries having good performances.

A first subject-matter of the present invention is thus the use of lithium nitrate, as sole lithium salt providing the ion conductivity in a lithium battery comprising at least one positive electrode, at least one non-aqueous electrolyte and at least one negative electrode based on lithium metal or on a lithium alloy, said positive electrode and said electrolyte both being gelled, said battery being devoid of polysulfide ions, for improving the lifetime of said battery.

According to this use, the lithium nitrate can be present in the gelled non-aqueous electrolyte and/or in the composite positive electrode before the first charge/discharge cycle of said battery.

A second subject-matter of the invention is thus a gelled non-aqueous electrolyte for a gelled lithium battery, said electrolyte being characterized in that it contains lithium nitrate as sole lithium salt providing the ion conductivity, at least one solvent and at least one gelling polymer.

According to a preferred embodiment of the invention, the amount of lithium nitrate in the gelled electrolyte varies from 2% to 70% by weight and more preferentially still from 2% to 25% by weight, with respect to the total weight of the electrolyte.

The solvent(s) of the gelled non-aqueous electrolyte can be chosen from linear or cyclic ethers, carbonates, sulfur-comprising solvents (sulfolanes, sulfones, DMSO, and the like), linear esters or cyclic esters (lactones), nitriles, and the like.

Mention may in particular be made, among such solvents, of dimethyl ether, polyethylene glycol dimethyl ethers (or PEGDMEs), such as tetraethylene glycol dimethyl ether (TEGDME), dioxolane, ethylene carbonate (EC), propylene carbonate (PC), dimethyl carbonate (DMC), diethyl carbonate (DEC), methyl isopropyl carbonate (MiPC), ethyl acetate, ethyl butyrate (EB) and their mixtures.

Preferably, the solvent(s) represent from 20% to 89.5% by weight and more preferentially still from 35% to 75% by weight, with respect to the total weight of gelled non-aqueous electrolyte.

The gelling polymer(s) of the gelled non-aqueous electrolyte can be chosen from polyolefins, such as homopolymers or copolymers of ethylene and of propylene, or a mixture of at least two of these polymers; homopolymers and copolymers of ethylene oxide (e.g. PEO, copolymer of PEO), of methylene oxide, of propylene oxide, of epichlorohydrin or of allyl glycidyl ether, and their mixtures; halogenated polymers, such as homopolymers and copolymers of vinyl chloride, of vinylidene fluoride (PVdF), of vinylidene chloride, of tetrafluoroethylene or of chlorotrifluoroethylene, copolymers of vinylidene fluoride and of hexafluoropropylene (PVdF-co-HFP) and their mixtures; homopolymers and copolymers of styrene and their mixtures; vinyl polymers; non-electron-conducting polymers of anionic type, such as poly(styrenesulfonate), le poly(acrylic acid), le poly(glutamate), alginate, pectin, carrageenan and their mixtures; polyacrylates; and one of their mixtures.

According to the invention, the gelling polymer(s) preferably represent from 5% to 60% by weight and more preferentially still from 15% to 50% by weight, with respect to the total weight of gelled non-aqueous electrolyte.

As indicated above, the lithium nitrate can also be an ingredient of the composite positive electrode of the battery before its first charge/discharge cycle.

A third subject-matter of the invention is thus a gelled positive electrode for a gelled lithium battery, said electrode being characterized in that it is composed of at least one positive electrode active material capable of reversibly inserting lithium ions, of lithium nitrate as sole lithium salt providing the ion conductivity and of at least one polymer binder, and in that it comprises a gelled non-aqueous electrolyte as defined according to the second subject-matter of the invention.

Thus, said gelled positive electrode in accordance with the present invention is characterized in that it comprises at least one positive electrode active material capable of reversibly inserting lithium ions, lithium nitrate as sole lithium salt providing the ion connectivity, at least one solvent, at least one gelling polymer and at least one polymer binder.

According to a preferred embodiment of the invention, the amount of lithium nitrate in the gelled positive electrode varies from 0.5% to 10% by weight and more preferentially still from 2% to 6% by weight, with respect to the total weight of the composite positive electrode.

The gelled positive electrode in accordance with the present invention preferably comprises from 10% to 45% by weight and more preferentially still from 10% to 25% by weight of a said gelled non-aqueous electrolyte comprising lithium nitrate at a concentration varying from 0.5 mol/l to 10 mol/l.

The solvent(s) as well as the gelling polymer(s) which can be used in the gelled positive electrode in accordance with the third subject-matter of the invention are as defined according to the second subject-matter of the invention.

The gelled positive electrode active material can in particular be chosen from lithium iron phosphates, vanadium oxides $VO_x$ ($2 \leq x \leq 2.5$), $LiV_3O_8$, $Li_yNi_{1-x}CO_xO_2$, ($0 \leq x \leq 1$; $0 \leq y \leq 1$), manganese spinels $Li_yMn_{1-x}M_xO_2$ (M=Cr, Al, V, Ni, $0 \leq x \leq 0.5$; $0 \leq y \leq 2$), used alone or as mixtures.

According to a preferred embodiment of the invention, the active material of the gelled positive electrode is chosen from lithium iron phosphates, such as, in particular, $LiFePO_4$.

The positive electrode active material preferably represents from 55% to 90% by weight and more preferentially still from 70% to 90% by weight approximately, with respect to the total weight of the gelled positive electrode.

The polymer binder can be chosen from PVdF, a copolymer of PVdF, poly(ethylene oxide) (PEO), a copolymer of PEO, a conductive polymer of cationic type, a polyolefin, such as polyethylene, a polyolefin copolymer, such as a polyethylene copolymer, and one of their mixtures.

The polymer binder preferably represents from 2% to 20% by weight approximately and more preferentially still from 3% to 15% by weight, with respect to the total weight of gelled positive electrode.

The gelled positive electrode can additionally include at least one electronic conduction additive. In this case, such an additive can in particular be chosen from carbon-based fillers, such as carbon black, graphite, carbon fibres and nanofibres, carbon nanotubes and graphene; the particles of at least one conductive metal, such as aluminium, platinum, iron, cobalt and nickel; and one of their mixtures.

The electronic conduction additive preferably represents from 0% to 10% by weight and more preferentially still from 0% to 3% by weight, with respect to the total weight of gelled positive electrode.

According to a preferred embodiment of the invention, the gelled positive electrode is deposited on a current collector. The current collector of the gelled positive electrode is then preferably made of aluminium, optionally coated with a carbon-based layer.

Finally, a fourth subject-matter of the invention is a gelled lithium battery comprising a positive electrode, a negative electrode based on lithium metal or on a lithium alloy, and a gelled non-aqueous electrolyte positioned between said positive electrode and said negative electrode, said battery being characterized in that:
- it is devoid of polysulfide ions,
- it comprises lithium nitrate as sole lithium salt providing the ion conductivity, and
- said gelled non-aqueous electrolyte is a gelled non-aqueous electrolyte as defined according to the second subject-matter of the invention and/or said positive electrode is a gelled positive electrode as defined according to the third subject-matter of the invention.

Thus, according to the invention, the lithium nitrate providing the ion conductivity of the battery during its operation is introduced before the first charging of the battery, and it is either in the gelled non-aqueous electrolyte, or in the positive electrode, or both in the gelled non-aqueous electrolyte and in the positive electrode.

According to a preferred embodiment of the invention, the total amount of lithium nitrate in the combined elements constituting a {positive electrode+gelled non-aqueous electrolyte} complex of the battery varies from 0.5% to 30% by weight and more preferentially still from 0.5% to 15% by weight, with respect to the total weight of the complex.

In the lithium battery according to the present invention, the thickness of the different elements of the battery is generally of the order of 1 to approximately one hundred micrometres.

DETAILED DESCRIPTION

Figure 1:
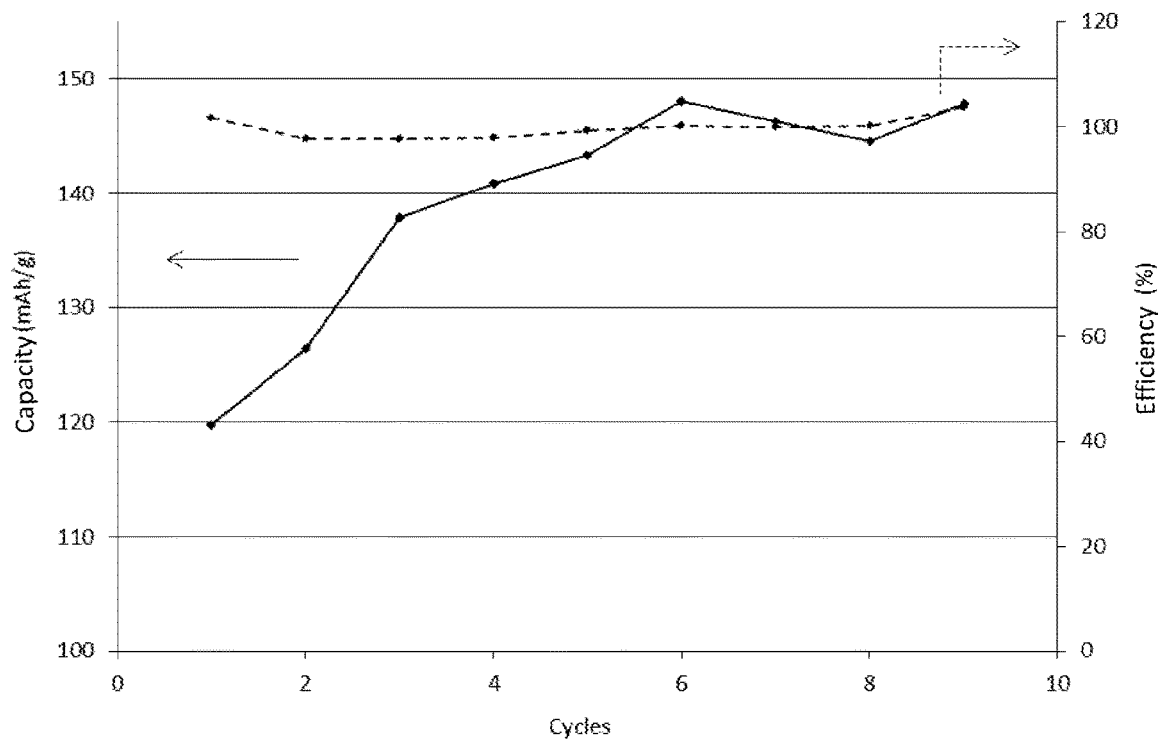
FIG. 1 is a graph illustrating the change in the discharge capacity of the cells (in mAh/g) and in the coulombic efficiency (in %) as a function of the cycle number, in example 1, in accordance with one embodiment.

The present invention is illustrated by the following examples, to which, however, it is not limited.

EXAMPLES

The advantage of using lithium nitrate in the composition of the electrolyte and/or of the positive electrode can be measured by characterization of the electrodeposit of lithium in a symmetrical lithium/electrolyte/lithium cell and by monitoring the cycling of complete cells.

Example 1: Demonstration of the Effect of Lithium Nitrate on the Quality of the Lithium Electrodeposit A complete cell having the following structure was prepared:

Gelled electrolyte (gelled non-aqueous electrolytic solution according to the second subject-matter of the invention):
- 25 g, i.e. 50% by weight, of a 4.6M solution of lithium nitrate (Alfa Aesar) in polyethylene glycol dimethyl ether (PEGDME 240 g/mol, sold by TCI Chemicals);
- 22.5 g, i.e. 45% by weight, of PVdF Solef 21510 (Solvay);
- 2.5 g, i.e. 5% by weight, of polyethylene oxide copolyme (ICPDAP, sold by Nippon Shokubai).

The different constituents of the gelled electrolyte were mixed in a mixer sold under the Plastograph® trade name by Brabender® at a temperature of 110° C. The mixture thus obtained was subsequently rolled at 110° C. in the form of a gelled electrolyte film having a thickness of approximately 20 µm.

Gelled positive electrode (Gelled positive electrode comprising lithium nitrate according to the third subject-matter of the invention):
- 29 g, i.e. 58% by weight, of $LiFePO_4$ sold under the trade name LFP P600A by Pulead;

14 g, i.e. 28% by weight, of a 4.6M solution of lithium nitrate (Alfa Aesar) in polyethylene glycol dimethyl ether (PEGDME 240 g/mol, sold by TCI Chemicals);

6 g, i.e. 12% by weight, of PVdF Solef 21510 (Solvay);

1 g, i.e. 2% by weight, of carbon black sold under the trade name Ketjenblack® EC600JD by Akzo Nobel.

The different constituents of the gelled positive electrode were mixed in a mixer sold under the Plastograph® trade name by Brabender® at a temperature of 140° C. The mixture thus obtained was subsequently rolled at 95° C. in the form of a gelled positive electrode film having a thickness of approximately 30 μm.

Assembling of the Cells:

A strip of lithium metal with a thickness of 100 μm was used as negative electrode.

An aluminium collector comprising a carbon-based coating (Armor) was used as current collector for the positive electrode. The different lithium/gelled electrolyte/positive electrode/collector layers were rolled under 5 bars of pressure at a temperature of 80° C. in order to manufacture the cells. The rolling was carried out under a controlled atmosphere (dew point −40° C.).

The cells thus prepared were subsequently confined in a heat-sealable leaktight packaging in order to protect them from moisture.

The cells were tested in galvanostatic cycling (constant current) at 40° C. The first cycle was carried out at C/10 (charge in 10 hours) and D/10 (discharge in 10 hours) and the following ones at C/4 (charge in 4 hours) and D/2 (discharge in 2 hours).

The change in the discharge capacity of the cells (in mAh/g) and in the coulombic efficiency (in %) as a function of the cycle number is given in the appended FIG. 1. In this figure, the solid-line curve corresponds to the discharge capacity and the dotted-line curve corresponds to the coulombic efficiency.

These results show the good restored capacity at 40° C. In particular, an increase in the latter over the cycles is noted. The efficiency of the cell is also stable. These results testify to the good quality of the lithium deposit at the negative electrode and demonstrate that the presence of lithium nitrate makes it possible to improve the performances of a gelled lithium battery, in particular its lifetime.

Example 2: Other Demonstrational Example of the Effect of Lithium Nitrate on the Quality of the Lithium Electrodeposit A complete cell having the following structure was prepared:

Gelled electrolyte (gelled non-aqueous electrolytic solution according to the second subject-matter of the invention):

25 g, i.e. 50% by weight, of a 1M solution of lithium nitrate (Alfa Aesar) in polyethylene glycol dimethyl ether (PEGDME 240 g/mol, sold by TCI Chemicals);

22.5 g, i.e. 45% by weight, of PVdF Solef 21510 (Solvay);

2.5 g, i.e. 5% by weight, of polyethylene oxide copolymer (ICPDAP, sold by Nippon Shokubai).

The different constituents of the gelled electrolyte were mixed in a mixer sold under the Plastograph® trade name by Brabender® at a temperature of 110° C. The mixture thus obtained was subsequently rolled at 110° C. in the form of a gelled electrolyte film having a thickness of approximately 20 μm.

Gelled positive electrode (Gelled positive electrode comprising lithium nitrate according to the third subject-matter of the invention):

29 g, i.e. 58% by weight, of $LiFePO_4$ sold under the trade name LFP P600A by Pulead;

14 g, i.e. 28% by weight, of a 1M solution of lithium nitrate (Alfa Aesar) in polyethylene glycol dimethyl ether (PEGDME 240 g/mol, sold by TCI Chemicals);

6 g, i.e. 12% by weight, of PVdF Solef 21510 (Solvay);

1 g, i.e. 2% by weight, of carbon black sold under the trade name Ketjenblack® EC600JD by Akzo Nobel.

The different constituents of the gelled positive electrode were mixed in a mixer sold under the Plastograph® trade name by Brabender® at a temperature of 140° C. The mixture thus obtained was subsequently rolled at 95° C. in the form of a gelled positive electrode film having a thickness of approximately 30 μm.

Assembling of the Cells:

A strip of lithium metal with a thickness of 100 μm was used as negative electrode.

An aluminium collector comprising a carbon-based coating (Armor) was used as current collector for the positive electrode. The different lithium/gelled electrolyte/positive electrode/collector layers were rolled under 5 bars of pressure at a temperature of 80° C. in order to manufacture the cells. The rolling was carried out under a controlled atmosphere (dew point −40° C.).

The cells thus prepared were subsequently confined in a heat-sealable leaktight packaging in order to protect them from moisture.

The cells were tested in galvanostatic cycling (constant current) at 40° C. The first cycle was carried out at C/10 (charge in 10 hours) and D/10 (discharge in 10 hours) and the following ones at C/4 (charge in 4 hours) and D/2 (discharge in 2 hours).

Figure 2:
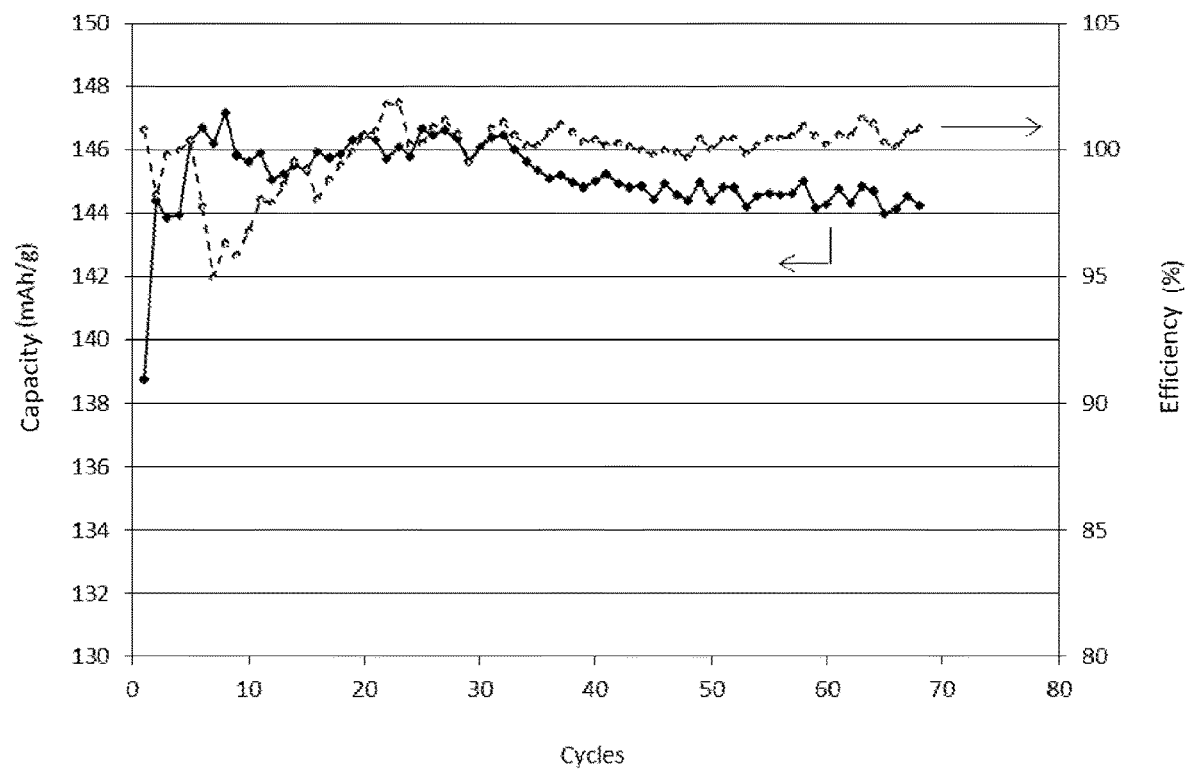
FIG. 2 is a graph illustrating the change in the discharge capacity of the cells (in mAh/g) and in the coulombic efficiency (in %) as a function of the cycle number, in example 2, in accordance with one embodiment.

The change in the discharge capacity of the cells (in mAh/g) and in the coulombic efficiency (in %) as a function of the cycle number is given in the appended FIG. 2. In this figure, the solid-line curve corresponds to the discharge capacity and the dotted-line curve corresponds to the coulombic efficiency.

These results show that the discharge capacity of the cell remains stable over several tens of cycles. Furthermore, the restored capacity is close to the theoretical capacity expected (170 mAh/g), testifying to the satisfactory operation of the cell. The coulombic efficiency is stable from the 20th cycle, close to 100%, which testifies to the reversibility of the electrochemical processes at work in the system.

The invention claimed is:

1. A lithium battery having an improved lifetime, wherein said lithium battery comprises:

at least one gelled positive electrode containing at least one positive electrode active material capable of reversibly inserting lithium ions, lithium nitrate, at least one first solvent, at least one first gelling polymer, and at least one polymer binder, at least one gelled non-aqueous electrolyte containing lithium nitrate, at least one second solvent and at least one second gelling polymer, wherein said at least one first solvent and said at least one second solvent are the same or different, wherein said at least one first gelling polymer and said at least one second gelling polymer are the same or different, and at least one negative electrode based on lithium metal or on a lithium alloy, said battery being devoid of polysulfide ions, wherein said lithium nitrate is the sole lithium salt of said battery providing the ion conductivity, wherein said lithium nitrate is present in the gelled non-aqueous electrolyte and in the gelled positive electrode before the first charge/discharge cycle of said battery, and wherein the amount of lithium nitrate in said gelled non-aqueous electrolyte varies from 2% to 70% by weight, with respect to the total weight of the gelled non-aqueous electrolyte, and/or the amount of lithium nitrate in said gelled positive electrode varies from 0.5% to 10% by weight, with respect to the total weight of the gelled positive electrode.

2. The lithium battery according to claim 1, wherein the at least one first solvent, or the at least one second solvent, or both are selected from the group consisting of linear or cyclic ethers, carbonates, sulfur-comprising solvents, linear or cyclic esters and nitriles.

3. The lithium battery according to claim 1, wherein the at least one first gelling polymer, or the at least one second gelling polymer, or both are selected from the group consisting of polyolefins; homopolymers and copolymers of ethylene oxide and their mixtures; halogenated polymers; homopolymers and copolymers of styrene and their mixtures; vinyl polymers; non-electron-conducting polymers of anionic type; polyacrylates; and one of their mixtures.

4. The lithium battery according to claim 1, wherein the at least one second gelling polymer(s) represent from 5% to 60% by weight, with respect to the total weight of said gelled non-aqueous electrolyte.

5. The lithium battery according to claim 1, wherein said gelled positive electrode comprises from 10% to 45% by weight of said gelled non-aqueous electrolyte comprising lithium nitrate at a concentration of 0.5 mol/l to 10 mol/l.

6. The lithium battery according to claim 1, wherein the positive electrode active material represents from 55% to 90% by weight, with respect to the total weight of gelled positive electrode.

7. The lithium battery according to claim 1, wherein said gelled positive electrode is deposited on a current collector.

8. The lithium battery according to claim 1, wherein the positive electrode active material comprises lithium iron phosphate.

9. The lithium battery according to claim 1, wherein a total amount of lithium nitrate in the gelled positive electrode and the gelled non-aqueous electrolyte comprises from 0.5% to 30% by weight, with respect to the total weight of said gelled positive electrode and gelled non-aqueous electrolyte of said battery.

* * * * *